Feb. 7, 1956 — P. C. KNOX, III — 2,733,882
CHRISTMAS TREE HOLDER
Filed Dec. 7, 1953 — 3 Sheets-Sheet 1
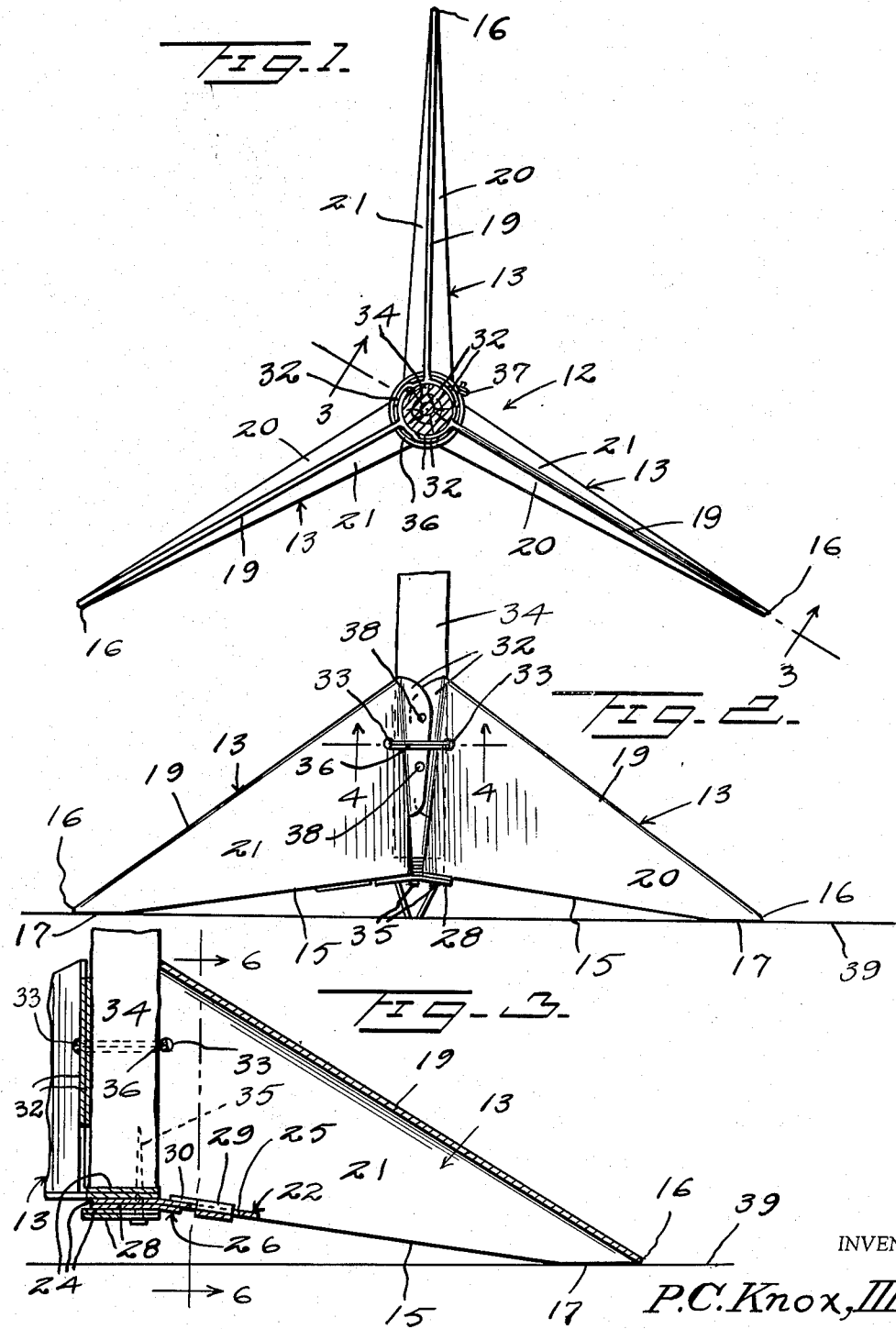
INVENTOR
P. C. Knox, III.
BY John N. Randolph
ATTORNEY Feb. 7, 1956  P. C. KNOX, III  2,733,882
CHRISTMAS TREE HOLDER
Filed Dec. 7, 1953  3 Sheets-Sheet 2
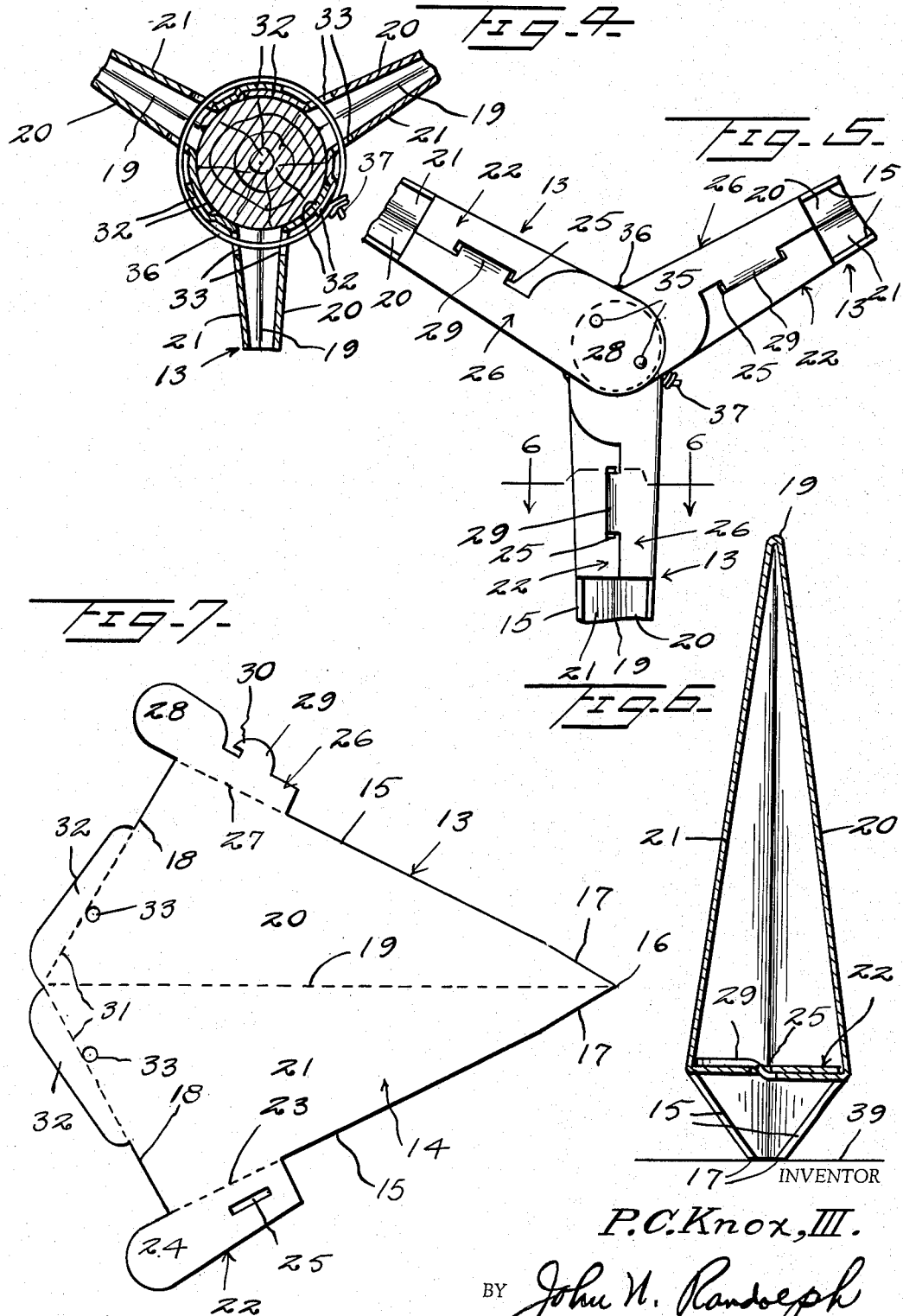
INVENTOR
P. C. Knox, III.
BY John N. Randolph
ATTORNEY

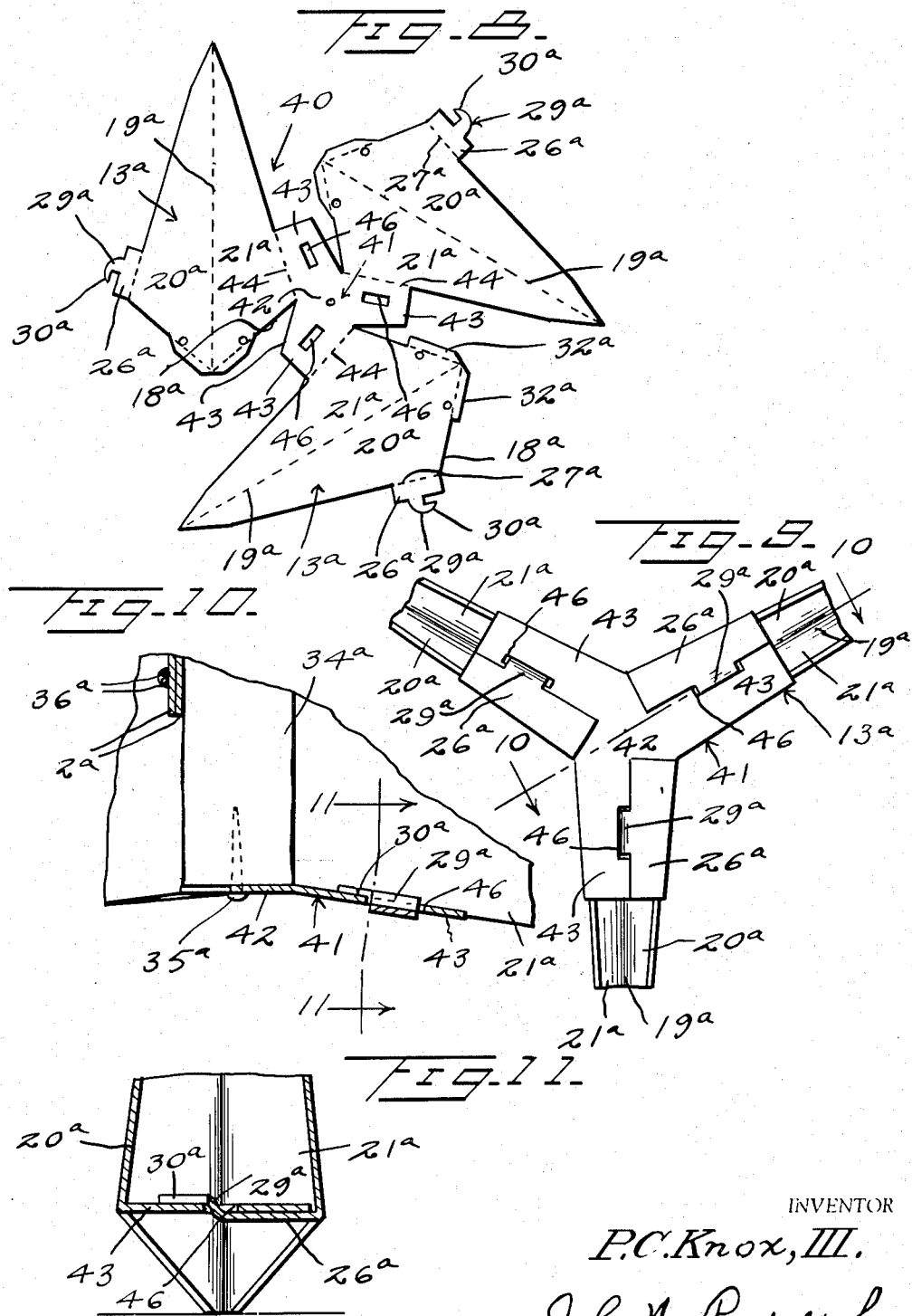

United States Patent Office 2,733,882
Patented Feb. 7, 1956

2,733,882
CHRISTMAS TREE HOLDER
Philander C. Knox III, De Land, Fla.

Application December 7, 1953, Serial No. 396,380

3 Claims. (Cl. 248—46)

This invention relates to a novel holder or stand primarily adapted as a base for attachment to the trunk of a Christmas tree for supporting the tree in an upright position but which is likewise capable of being used as a base for other upright members including a pole or staff similar to a tree trunk.

A primary object of the present invention is to provide a tree holder or stand of extremely simple construction which may be very economically manufactured and sold and which is capable of being quickly and easily secured to the lower end of a tree trunk so that the stand may be used for displaying a Christmas tree for sale and sold with the Christmas tree, whereby the purchaser is not required to make a separate purchase of a stand and apply it to the tree.

A further object of the invention is to provide a tree holder or stand which may be packaged for storage or sale in a substantially flat envelope requiring a minimum of space and in which form the stand may additionally be sold separately.

Still another object of the invention is to provide a tree stand or holder capable of being manufactured and sold at such a reasonable price that it may be disposed of after use, yet which is sufficiently strong and durable that it may be retained for repeated use and stored in a minimum space in a flat form.

Various other objects and advantages of the invention will hereinafter become more fully apparent from the following description of the drawings, illustrating presently preferred embodiments thereof, and wherein:

Figure 1 is a top plan view of the assembled stand or holder shown secured to a tree trunk, illustrated in cross section;

Figure 2 is a side elevational view thereof;

Figure 3 is an enlarged fragmentary sectional view taken substantially along a plane as indicated by the line 3—3 of Figure 1;

Figure 4 is an enlarged fragmentary cross sectional view taken substantially along a plane as indicated by the line 4—4 of Figure 2;

Figure 5 is a fragmentary bottom plan view of the central portion of the stand or holder applied to a tree trunk;

Figure 6 is an enlarged cross sectional view taken substantially along a plane as indicated by the line 6—6 of Figure 5;

Figure 7 is a plan view of one of the blanks from which a section of the holder is formed;

Figure 8 is a view similar to Figure 7 showing a slightly different form of the tree holder in blank form;

Figure 9 is a fragmentary bottom plan view similar to Figure 5 of the modified form of holder and on an enlarged scale relatively to Figure 8;

Figure 10 is a fragmentary sectional view taken substantially along a plane as indicated by the line 10—10 of Figure 9 and on an enlarged scale, and Figure 11 is a fragmentary enlarged cross sectional view, taken substantially along a plane as indicated by the line 11—11 of Figure 10.

Referring more specifically to the drawings and first with reference to the form of the invention as illustrated in Figures 1 to 7, the Christmas tree holder or stand in its entirety and comprising the invention is designated generally 12 and includes a plurality, preferably three holder sections, each designated generally 13. As the holder sections 13 are identical, a description of the structure of one will suffice for all. Each holder section 13 is preferably formed from a single blank of stiff cardboard or stiff paper, as illustrated in Figure 7, which blank includes a body portion 14 having edges 15 converging toward a narrow outer end 16 of said body portion 14 and which edges include portions 17 located adjacent the end 16 and which converge at a greater angle to one another than the remaining portions of the edges 15. The other end of the body member 15 is defined by edges 18 of the blank which converge and merge with one another at a much greater angle than said edges 15 or 17. The body portion 14 is divided by a central fold line 19 which extends from the point 16 to the point of mergence of the edges 18 and which divides the body portion 14 into corresponding parts 20 and 21 forming the two walls of the section 13, as will hereinafter become apparent.

The blank forming the section 13 also includes a female extension 22 which extends outwardly from the end portion of the edge 15 which merges with the edge 18 of the part 21 and which is joined to the part 21 by a fold line 23 constituting a part of said last mentioned edge 15. The female extension 22 has an unsecured end 24 which projects outwardly beyond the adjacent inner edge 18 of the part 21. Said extension 22 is also provided with a longitudinally elongated slot 25 disposed therein remote from said projection 24. The part 20 is provided with a male projection 26 arranged in the same location relatively to its edge 15 as the female extension 22 of the part 21 and which is connected to the part 20 by a fold line 27 forming the end part of the edge 15 of the part 20, which merges with the adjacent edge 18. The extension 26 is likewise provided with an outwardly projecting unsecured end or projection 28 which extends beyond the adjacent edge 18. Said extension 26, remote from the projection 28, is provided with a tongue 29 which projects laterally from its outer edge and which includes a hook portion 30.

The adjacently disposed portions of the two edges 18 are formed by fold lines 31 which merge with the inner end of the fold line 19 and which connect flaps 32 to corresponding portions of the parts 20 and 21. The flaps 32 are relatively long and extend in directions parallel to the edges 18 from the inner end of the center fold line 19 toward the extensions 22 and 26. Each of the parts 20 and 21 is also provided with an opening 33 located adjacent its fold line 31 and spaced from the ends of its flap 32.

To convert the blank as illustrated in Figure 7 into a holder section 13 as illustrated in Figures 1 and 2, the body portion 14 is folded along its central fold line 19 so that the walls or parts 20 and 21 are disposed in converging relationship toward the fold 19. The female extension 22 is then turned inwardly as illustrated in Figure 6 to extend toward the fold line 27 of the wall 20, after which the male extension 26 is bent inwardly and upwardly on its fold line 27 to assume a position beneath the female extension 22, and the tongue 29 thereof is passed upwardly through the slot 25 and interlocked therein by the hook portion 30, which engages the upper side of the extension 22 beyond one end of the slot 25, to main the extensions 22 and 26 in interlocking relationship, as illustrated in Figures 3 and 6, for maintaining the walls 20 and 21 in positions, relatively to one another, as best illustrated in Figure 6. The two flaps 32 are then bent outwardly on their fold lines 31 and the section 13 is inverted so that the fold 19 constitutes the upper edge or ridge thereof and the edges 15 constitute the bottom edges of the section.

Three of the sections 13 are then arranged in equally spaced relationship around the lower portion of the trunk 34 of a tree with the edges 18 and folds 31, constituting the inner ends of the sections 13, disposed against circumferentially spaced portions of the trunk 34 and with the unsecured projections 24 and 28 arranged in overlapping relationship, as illustrated in Figures 2 and 3, and disposed beneath the lower end of the trunk 34. The projections 24 and 28 of each section 13 are positioned with the section 28 beneath the section 24 when the extensions 22 and 26 are interlocked, as previously described. One or more fastenings such as nails 35 are then driven upwardly through the overlapping projections 24 and 28 into the lower end of the trunk 34. The flaps 32 which are folded outwardly from the walls 20 and 21 engage around the tree trunk between the sections 13 with adjacent flaps 32 of the different sections 13 arranged in overlapping relationship, as illustrated in Figures 1 and 2. The sections 13 are additionally secured to the tree trunk 34 by a strand of wire 36 which is passed one or more times around the tree trunk and around the flaps 32, portions of said strand extending through the two openings 33 of each section 13. The ends of the wire strand 36 are secured together as by twisting, as seen at 37 in Figures 1, 4 and 5. The sections 13 may be additionally secured to the trunk 34 by additional fastenings 38, such as nails, which may be driven through the overlapping portions of the flaps 32 into the tree trunk 34, as illustrated in Figure 2. However, ordinarily, either the fastenings 38 or the wire fastening 36 is omitted.

When the three sections 13 are thus secured to the trunk 34 the bottom edge portions 17 will be disposed substantially at right angles to the edges 18 and folds 31 which engage the trunk 34 so that when the trunk is disposed in an upright position and supported by the holder 12, said edge portions 17 which are disposed remote from the trunk 34 will rest substantially flush against a floor or other supporting surface 39, as illustrated in Figures 2, 3 and 6, to provide a stable support for the holder 12 and the tree supported thereby. The edge portions 15 will be inclined downwardly and outwardly from the inner ends of the holder sections 13 toward the floor or surface 39.

From the foregoing it will be apparent that a holder of extremely simple construction has been provided which may be very economically manufactured and sold to provide an inexpensive yet very stable and durable tree holder or stand. It will also be apparent that the holder or stand may be quickly and easily applied to a trunk of a tree after first assembling the holder sections and may likewise be easily removed therefrom and the sections dismantled. It will also be obvious that three of the blanks as illustrated in Figure 7 can be readily enclosed in a flat envelope and stacked one upon another for storage or sale. The size of the sections 13 may obviously be varied depending upon the size of a tree to be supported by the holder.

Figures 8 to 11 illustrate a slightly different form of the holder, designated generally 40, and which is primarily adapted for use with smaller and lighter weight trees than the holder 12. The holder 40 differs from the holder 12 in that the three sections 13a thereof are integrally joined by a member 41 which replaces the three female extensions 26 of the holder 12. The complete holder 40 is illustrated in blank form in Figure 8 and may be formed from a single blank of heavy paper or cardboard. The individual sections 13a of the holder 40, except for the extensions of the walls thereof, correspond to the sections 13.

The connector 41 includes a central portion 42 from which project three equally spaced arms or extensions 43. Said arms 43 have corresponding side edges which are formed integral with side edges of the section walls 21a along fold lines 44. The other side edges 45 of the arms 43 extend in outwardly diverging relationship from adjacent edges 18a of the walls 21a. Each of the arms or extensions 43 is provided with a longitudinally elongated slot 46.

In lieu of the extensions 26, the walls 20a are provided with extensions 26a from which the unsecured projections 28 are omitted but which include tongues 29a having hook portions 30a. The flaps 32a are preferably shorter than the flaps 32, in ratio to the length of the edges 18 and 18a, so as not to overlap the edges 45 of the arms 43. The sections 13a are otherwise identical with the sections 13, and a further description thereof is considered unnecessary.

To assemble the holder 40 from its blank form as illustrated in Figure 8, each of the walls 20a is folded over the adjacent walls 21a along the fold or ridge line 19a, after which the sections 13a are swung or folded upwardly along the fold lines 44. The extensions 26a are then folded inwardly on their fold lines 27a around the edges 45 of the arms or extensions 43 and the tongues 29a are then passed upwardly through the slots 46 and interlocked with the arms or extensions 43 by the hook portions 30a, in the same manner as previously described in reference to the hook portions 30. The flaps 32 are then folded outwardly, after which the tree trunk 34a is inserted between said flaps 32a and the edges 18a, toward the central portion 42 of the connector 41, and the end of the trunk is disposed against said portion 42, as illustrated in Figure 10, and is secured thereto by a fastening 35a which is driven through the portion 42 into the trunk 34a. Thus, only a single thickness of the material of the holder 40 abuts against the end of the trunk 34a. The holder sections 13a are then secured around the trunk 34a by means of a wire 36a, in the same manner as previously described in reference to the holder 12, or by driven fastenings, not shown, in the same manner that the fastenings 38 are utilized. The holder 40 as thus secured to the trunk 34a will function in the same manner as the holder 12 and a further description thereof is considered unnecessary. However, it will be apparent that the holder 40 may likewise be removed and stored in blank form as illustrated in Figure 8, if desired.

From the foregoing it will be apparent that the holders 12 and 40, although formed of an inexpensive material such as stiff paper, cardboard or fiberboard, possess great strength which is derived from the construction of the individual holder sections 13 or 13a, due to the substantially triangular cross sectional shape thereof, as best illustrated in Figures 6 and 11, which shape additionally causes the inner ends of the holder sections to substantially conform to the curvature of the tree trunk.

It will likewise be apparent that the holders 12 and 40 may be used for supporting other upright members such as poles or the like.

Various other modifications and changes are contemplated and may obviously be resorted to, without departing from the spirit or scope of the invention as hereinafter defined by the appended claims.

I claim as my invention:

1. A holder or stand of the character described comprising at least three elongated holder sections each comprising a pair of corresponding elongated walls, said walls converging upwardly relative to one another from bottom edges thereof and merging at their upper edges in a ridge portion which extends from end-to-end of the section, said walls tapering in width from inner ends thereof to their outer ends and the botttom edges thereof merging with one another and with an end of the ridge portion at said outer ends of the walls, said bottom edges having outer end portions disposed at an angle to the remainder of the bottom edges and resting flush on a supporting surface for positioning the section with the ridge portion and the remainder of the bottom edges inclined inwardly and upwardly, said inner ends of the walls being disposed in upwardly converging relation to one another and at an angle relative to said outer end portions such as to abut substantially flush against a tree trunk or the like which is disposed with it axis normal to the plane of said supporting surface; said holder sections being disposed in spaced relation to one another around the tree trunk, said walls having outturned flaps forming extensions of the inner ends thereof, said flaps engaging the tree trunk between said sections, said walls having openings adjacent the inner ends thereof, and securing means comprising a strand member extending through said openings and adapted to engage around the tree trunk and the flaps for securing the holder sections rigidly to the tree trunk.

2. A holder or stand as in claim 1, extensions projecting from the bottom edges of the walls of each section toward the other wall thereof, said extensions being disposed adjacent the inner ends of the side walls, and tongue and slot means interlocking said extensions for maintaining the walls in upwardly converging relation to one another.

3. A holder or stand as in claim 2, said holder or stand being formed from a single blank including a central portion, one extension of each of the sections constituting a part of the central portion, and said central portion including an intermediate part adapted to abut against and be secured to the lower end of the tree trunk.

References Cited in the file of this patent

UNITED STATES PATENTS

| | | |
|---|---|---|
| 558,433 | Stoddard | Apr. 14, 1896 |
| 1,445,625 | Junkunc | Feb. 20, 1923 |
| 1,603,784 | Lorenz | Oct. 19, 1926 |
| 1,792,968 | Danforth | Feb. 17, 1931 |
| 2,107,638 | Lyons | Feb. 8, 1938 |
| 2,205,271 | Pleiss | June 18, 1940 |
| 2,390,292 | Burton | Dec. 4, 1945 |
| 2,461,748 | Looker | Feb. 15, 1949 |
| 2,615,660 | Haumann | Oct. 28, 1952 |